United States Patent [19]
Borrelli et al.

[11] Patent Number: 4,518,222
[45] Date of Patent: May 21, 1985

[54] OPTICAL DEVICE AND METHOD

[75] Inventors: Nicholas F. Borrelli, Elmira; Donald M. Trotter, Corning, both of N.Y.

[73] Assignee: Corning Glass Works, Corning, N.Y.

[21] Appl. No.: 559,294

[22] Filed: Dec. 8, 1983

[51] Int. Cl.³ .................... G02B 1/00; G02B 27/00; B29C 27/00; C03C 21/00

[52] U.S. Cl. ........................ 350/167; 65/33; 65/111; 156/84; 350/417; 428/428; 430/295; 430/322

[58] Field of Search .............. 65/30.1, 30.13, 30.14, 65/31, 33, 111; 156/84, 85, 86; 350/167, 417; 428/212, 218, 426, 428; 430/295, 322, 325, 328

[56] References Cited

U.S. PATENT DOCUMENTS 2,628,160 2/1953 Stookey .................... 65/111

*Primary Examiner*—John K. Corbin
*Assistant Examiner*—William Propp
*Attorney, Agent, or Firm*—C. S. Janes, Jr.

[57] ABSTRACT

There is disclosed an improved optical device of the type disclosed in application Ser. No. 520,456 and embodying an array of lenses integral with and raised above a crystalline matrix. The improvement comprises an ion-exchanged surface on the lenses wherein the lithium ion from the lens glass is exchanged with a larger monovalent ion, preferably sodium or potassium from a bath, and the contents of such alkali metal ions in the lens are defined by both radial and axial concentration gradients. The device may be heated above the glass strain point to relieve stress and enhance lens power, either simultaneously with or subsequent to the ion exchange.

13 Claims, 5 Drawing Figures

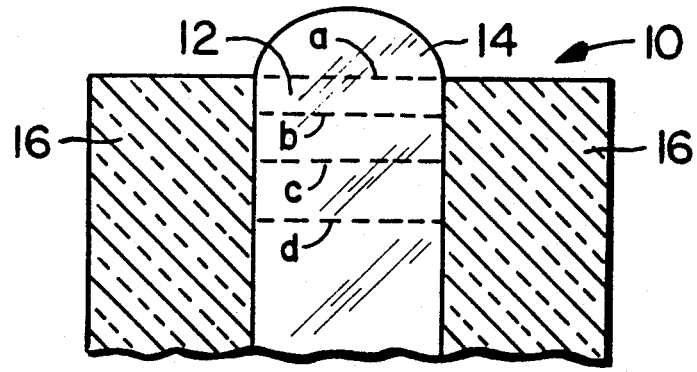

OPTICAL DEVICE AND METHOD

BACKGROUND OF THE INVENTION

U.S. patent application Ser. No. 520,456, filed Aug. 4, 1983 (Bellman et al.) discloses an optical device, and method of production, wherein a photonucleable, crystallizable glass body has a pattern of clear glass, raised, optical elements. The elements are formed integral with at least one surface on the body and surrounded by a crystallized matrix. A specific form of the device, designed for use in image reproduction, has an array of clear glass, parallel lens systems wherein each system is in the shape of a cylindrical glass rod extending through the body and culminating in a spherical-shaped lens at each end.

PURPOSE OF THE INVENTION

A basic purpose is to provide an improved optical device of the type disclosed in the Bellman et al. application.

A further purpose is to provide a simple method of producing the improved device.

A specific purpose is to improve the prior optical device by altering the optical properties inherent in the device as formed.

A more specific purpose is to alter these optical properties by an ion exchange between the glass and an external source.

A particular purpose is to alter such properties by creating ion concentration gradients in the glass which result in refractive index and dispersion gradients.

Another particular purpose is to provide an optical device comprising a lens array wherein the optical power of the lenses has been enhanced.

A further specific purpose is to adapt the chemical strengthening procedure of ion exchange to improvement of lens power in an optical system.

SUMMARY OF THE INVENTION

Our invention resides in an optical device composed of a photonucleable, crystallizable, lithium silicate glass body having a clear glass lens array integral with and rising above at least one surface, each lens being surrounded by a crystallized glass matrix, and being characterized by a layer extending below the lens surface wherein the lithium ion content is below the glass composition norm, the content of a larger, exchangeable alkali metal ion is greater than the glass norm for that ion, and the distribution of such alkali metal ion in the lens is defined by both radial and axial concentration gradients. In one particular form, the lens surfaces are essentially stress-free and their normal optical power is enhanced.

Our invention further contemplates a method of producing such improved device wherein a photonucleable, lithium silicate glass body is selectively crystallized to provide a crystalline matrix surrounding each lens in an array of spherical-shaped clear lenses integral with and rising above the matrix surface characterized by the improvement whereby a larger monovalent ion from an external source is exchanged for the lithium ion in a layer beneath the surface on the clear lenses to create variable alkali metal ion concentrations defined by both radial and axial concentration gradients.

PRIOR LITERATURE

The Bellman et al. application, already referred to, represents the state of the art upon which the present invention improves.

Ion exchange from a molten salt bath, for glass decorating and coloring, dates back to U.S. Pat. No. 2,075,446 (Leibig). More recently, ion exchange has received a great deal of attention in connection with development of chemical strengthening procedures. For example, U.S. Pat. No. 3,656,923 (Garfinkel et al.) shows ion exchange strengthening of a photochromic glass article.

U.S. Pat. No. 3,751,238 (Grego et al.) describes an ion exchange strengthening method in which a sodium silicate glass is contacted with potassium ions to effect an exchange, and the glass is, either simultaneously or subsequently, heated above the strain point to allow the glass structure to rearrange and relieve stress. Then the glass is again contacted with potassium ions below the strain point. This is designed to provide a better balanced stress pattern. However, enhancing mechanical strength is not normally considered to have any relationship to optical strengthening.

The sensitive element itself, silver, may be introduced into a glass surface by ion exchange, as shown in U.S. Pat. No. 2,904,432 (Ross et al.) and No. 2,732,298 (Stookey).

U.S. Pat No. 2,628,160 (Stookey) discloses photonucleable glasses that may be chemically sculptured. These glasses are adapted to having selected zones rendered crystalline by selective irradiation of such regions followed by heat treatment. The patent discloses that the crystallized and uncrystallized glass zones have much different etching rates. Bellman et al. disclose use of these glasses for development of optical patterns.

GENERAL DESCRIPTION OF THE INVENTION

In accordance with the teaching of the Bellman et al. application, a photonucleable, crystallizable, lithium silicate glass is selectively exposed to short wave radiation. The selective exposure may be accomplished, for example, through a transparent mask bearing an opaque pattern corresponding to the desired optical relief or raised pattern. A pattern of particular interest, disclosed by Bellman et al., is a lens array such as used in image transfer for photocopying.

During selective exposure, those glass zones shielded by the opaque pattern in the mask remain unchanged, while the exposed zones undergo photonucleation. When the glass is subsequently heat treated, crystal growth occurs on the nuclei in the exposed zones. In contrast, the shielded zones remain clear and glassy since there are no nuclei on which crystals can grow.

The application further discloses that, in a thin sheet or strip of glass, the contrasting clear glass and crystallized glass zones may extend through the glass from the exposed surface to the opposite surface. When a mask with a dot pattern is used to produce a lens array, the clear glass zones that develop under the dots tend to be like small, closely-spaced cylinders extending through the glass from surface to surface. The exposed zones tend to become denser and shrink as they crystallize. In the dot or cylindrical pattern then, the crystallized matrix tends to draw away from the clear cylinders. This produces a raised pattern on the glass surface in the nature of a lens array.

The development of a raised optical pattern by means of differential crystallization and consequent selective densification of a photonucleable glass is described in detail in the Bellman et al. application. Likewise, the patterns developed, more particularly lens arrays and systems, are described there. Accordingly, that application, in its entirety, is incorporated herein by reference.

We have now found that the characteristic optical properties of the prior optical device may be altered by exchanging ions within a layer beneath the glass surface. In particular, lithium ions from the glass are exchanged for a larger ion from an external source. Of particular interest are potassium and sodium ions from molten salt baths.

Due, we believe, to the nature of the device, and the consequent diverse directions and rates in which ion exchange proceeds, alkali metal ion concentration gradients are observed in the glass following ion exchange. These in turn generate refractive index and dispersion gradients. By proper control of these gradients, it should be possible to correct aberrations in lens systems, and thereby simplify the systems for such purposes as photography.

As described in detail later, we have further found that, if the ion-exchanged zones are heated above the strain temperature, the optical power of the lenses may be dramatically increased. The physical effect is to release stress and thereby permit reshaping of the lens.

Microprobe analyses have shown that the ion exchange process produces both radial and axial concentration gradients of alkali ions in the lenses. Specifically, with the processing used, the concentrations of lithium and potassium at the centers of the lenses were reduced relative to the concentrations at the circumferences. This produced a radial gradient which disappeared when the ion-exchanged depth was exceeded. The axial gradient resulted from variations with depth in alkali composition through the ion exchange depth from that of the bulk glass to fully exchanged material near the surface.

The three alkali ions differ considerably in their electronic polarizabilities (as shown in Table I below):

TABLE I

| Electronic Polarizabilities of Alkali Ions in $10^{-24}$ cm$^3$ | |
|---|---|
| Ion | Polarizability |
| $Li^+$ | 0.03 |
| $Na^+$ | 0.14 |
| $K^+$ | 1.33 |

In addition, the differing field strengths of the ions will modify differently the polarizability of the oxygen anions which dominate the polarizability of the glass because they are the most numerous and most polarizable ions present. The net result of these two effects is that equimolar substitution of $K^+$ for $Li^+$ in a glass reduces the refractive index substantially, and that $Na^+$ for $Li^+$ substitution produces an even greater reduction. This is demonstrated by comparing the refractive indices of all-Li, all-Na, and all-K analogues of the composition used for the device.

An additional effect is that the dispersion of the glass is altered as well as the refractive index, in accord with the Kramers-Kronig relations. Thus, the concentration gradients of alkali ions present in the lenses results in both refractive index and dispersion gradients. These gradients, in turn, will alter the optical properties of the lenses from those obtained with homogeneous lenses of the same physical shapes. The effects are small, and thus do not affect the gross imaging capabilities of the lenses. Depending on the specific application envisioned, however, minor alterations in the optical properties of the lenses may well be of significance.

The precise form of the gradient obtained depends sensitively on the processing. No attempt is made to define optimum effects, since the profile desired depends on the specific application.

The presence of the concentration gradients is independent of whether the sample has been heated above the strain point to relax induced stresses and change the physical profile of the lenses (thereby increasing their strengths). Since the time required for stress relaxation is small compared with typical ion-exchange treatment times, little smearing of the concentration gradients results from this additional heat treatment. Therefore, processing may include alternation of various ion exchange treatments, above or below the strain point, with heat treatments above the strain point. Only those treatments above the strain point will alter the physical profile of the lenses. By this means, the precise combination of physical lens profile and concentration gradient desired for a particular application may be built up.

Most important, however, is our discovery that the ion exchange may have a significant effect in reducing the radius of curvature of the lenses. This, in turn, enhances the optical power or strength of the lens. In contrast to chemical strengthening practice, no change in optical strength is observed unless the glass is heated above the glass strain point. Thus, the glass relaxes to an essentially stress-free state while the change in lens curvature occurs.

It will be appreciated that this improvement, while not so limited in application, is of particular utility in the production of a lens array for use in image transfer. This is especially true since the optical strength of a lens is a critical factor in reducing size of the transfer device, and hence the copier.

It is known, of course, that larger monovalent ions, such as sodium, potassium, and silver, will exchange for lithium ions from a lithium silicate glass. Such exchange, below the glass strain point, is the basis of much chemical strengthening of glasses and glass-ceramics. We have found, however, that such ion exchange can and does occur at a much faster rate, and to a much greater degree, in a clear glass than in a crystallized glass. This may be a result of the crystals impeding diffusion. It may also simply be due to a paucity of lithium ions available for exchange after crystal formation. In any case, we find the clear lens elements undergo normal ion exchange, whereas little if any exchange occurs in the crystalline matrix.

If the ion exchange is carried out below the glass strain point, the glass must subsequently be heated above the strain point. As long as suitable baths are available, it is usually preferred to use a higher temperature bath and combine the operations.

Unfortunately, the silver ion tends to spontaneously reduce. Therefore, where transmissive optics are involved, it is usually preferred to employ sodium or potassium ion sources for the invention.

Any source of exchangeable ion may be used in accordance with known ion exchange practice. However, we find molten salt baths most convenient for our purposes. The nitrate salts are usually employed although others are also suitable. Where higher temperatures are employed, salt mixtures may be employed to avoid salt deterioration and attack on the glass.

The optical performance of a sample may be characterized, both before and after ion exchange, by using a microscope with a calibrated focusing adjustment to measure image distances for objects at a known distance above and below the lens array. The power, P, of a lens is related to the radius of curvature of the lens, r, by $$P = (N_G - 1)/r$$

were r is in meters, P in diopters, and $N_G$ is the refractive index of the glass.

The lenses on opposite surfaces of a sample are usually different because exposure is from one surface only. Regions deeper in the sample receive an attenuated dose of radiation, and thus glass crystallization of varying degree occurs through the thickness of the sample. In general, then, this results in a weaker lens forming on the bottom or opposite surface.

DESCRIPTION OF THE DRAWING

In the accompanying drawing,

FIG. 1 is a fragmentary view in cross-section showing a portion of a lens system illustrating the invention, and FIGS. 2a, 2b, 2c, and 2d are graphical illustrations of ion concentrations along diameters of the lens cylinder of FIG. 1 at increasing depths below the surface of the cylinder.

Specific Embodiments

A series of samples embodying lens arrays was prepared in accordance with the procedure disclosed by Bellman et al. The glass used was one available from Corning Glass Works under Code 8603, and having a composition, as calculated in parts by weight, of:

SiO$_2$: 79.1
Li$_2$O: 9.4
Na$_2$O: 1.6
K$_2$O: 4.2
Al$_2$O$_3$: 4.2
ZnO: 1.0
Sb$_2$O$_3$: 0.4
Au: 0.0012
Ag: 0.115
CeO$_2$: 0.015
SnO: 0.003

Each sample was a strip of 2 mm thick glass. For selective exposure, one face was covered with a chrome dot mask. The masks employed were transmissive masks having opaque dots imprinted in order arrangements as identified later. Each masked sample was exposed to ultraviolet radiation from an Oriel solar simulator for 20 minutes. The glass strips, thus exposed, were heat treated at 560° C. for 30 minutes to further nucleate the exposed portions of the glass, and then raised to 600° C. for 30 minutes to crystallize those portions.

At this point, each glass sample was observed to have an array of clear glass lens systems surrounded by an opaque matrix. Rising slightly above the matrix surface were spherical-shaped caps on each end of each clear glass cylinder. These functioned as lenses, and lens power was measured on each sample before further treatment as well as after. The variations in subsequent treatment conditions, and the results observed to result therefrom, are reported hereafter.

EXAMPLE 1

One set of lens-bearing samples was immersed in a sodium nitrate molten salt bath at 375° C. for a period of 60 hours. Thereafter, it was transferred to a potassium nitrate molten salt bath at 450° C. for a period of 22 hours. At the conclusion of this treatment, one sample was removed, washed, dried and prepared for microprobe scanning.

FIG. 1 is a cross-section view of a fragment of the sample embodying a portion of one lens system identified generally by the numeral 10. Lens system 10 includes a clear (uncrystallized) cylindrical portion 12 and a spherical lens member 14, as well as a crystallized, opaque matrix 16. The FIGURE further has a series of spaced horizontal lines indicating levels at which microprobe scans were made along a diameter of cylindrical portion 12. The depths of these scan levels below the surface are indicated by "a", "b", "c", and "d", these letter indicia being selected to correlate the levels of FIG. 1 with the scan results shown in FIG. 2.

In the four graphical illustrations of FIG. 2, the level of potassium is indicated by the curve labeled "K"; the level of sodium by "Na" and the level of lithium by "Li". It may also be noted that the cylinder diameter is plotted in microns along the horizontal axis in general units which, in a given system, might be microns. Ion concentrations are in percent, but are plotted along the vertical axis on a logarithmic scale.

It will be observed that the sodium ion levels increase with depth and the potassium ion decreases. Also, the curved nature of the scan lines, which are 8-point, smoothed curves, indicate the radial gradients obtained under the indicated processing conditions. In particular, note that the radial gradient essentially disappears at deeper levels which exceed the ion-exchanged depth.

EXAMPLE 2

A lens array sample, prepared as described above, was immersed in a NaNO$_3$ salt bath at 375° C. At the end of an hour, the sample was removed, cleaned and weighed. It was then returned to the salt bath for a further treatment for three (3) hours at the same temperature. After weighing, the sample was given an extended salt bath treatment of 65 hours. Finally, the sample was immersed in a potassium nitrate bath operating at 450° C. and held at that temperature for 22 hours. The glass strain point was 416° C.

The weight gain after each treatment was reduced to percent and is shown as $\Delta m/m_o$ (%),

|  | $\Delta m/m_o$ (%) |
| --- | --- |
| 1 hr. 375° | 0.06 |
| 4 hr. 375° | 0.12 |
| 69 hr. 375° | 0.49 |
| plus 22 hr. 450° | 0.82 |

Lens power was measured in diopters, both before and after each treatment, and both front and back surface. The back surface lenses are consistently weaker as explained earlier. Consistent values of 520 diopters (front) and 425 diopters (back) were measured after each treatment, thus indicating no change until after the potassium salt bath treatment. Values of 775 and 560 diopters were then measured front and back, respectively.

The dramatic increase after the KNO3 bath treatment was ascribed to two factors. The 450° C. temperature was above the glass strain point. Hence, the stress, induced during the sodium treatments, was relaxed with resultant change of the lens shape. Also, the exchange of potassium ions ($K^{30}$) for lithium ions ($Li^+$) further increased the powers of the lenses. The latter was confirmed in Example 3.

EXAMPLE 3

Another lens array sample was treated by immersion in a KNO3 salt bath for cumulative times of one hour, five hours, and 21 hours. The bath was held at 450° C. as before, weight change was measured at each break, and lens power measurement was made before the start and at the conclusion.

Weight change is shown in percent change,

|  | $\Delta m/m_0$ (%) |
|---|---|
| 1 hr. 450° C. | 0.05 |
| 5 hr. 450° C. | 0.13 |
| 21 hr. 450° C. | 0.26 |

The final lens power was greater, but not as much as Example 2, thus indicating the role of $Na^+$ in Example 2. The measured values, in diopters, were 590 (front) and 540 (back); this compares with initial values 520 (front) and 425 (back).

EXAMPLE 4

A third lens array sample was immersed for 16 hours in a NaNO3 salt bath operating at 375° C. A weight gain of 0.19% was noted, but no change in lens power.

The sample was then heated in air for one hour at 450° C. Measurements showed the lens power, front and back, increased from 520/425 to 550/500 after this higher temperature treatment. The sample was then heated in air at 450° C. for an additional four (4) hours, but no change was noted. This indicated the stress induced during the $Na^+$ ion exchange was completely relieved in one hour at 450° C.

EXAMPLE 5

In each of the preceding examples, the lens size, as produced by selective radiation and heat treatment, was constant. The lenses were 300 microns in diameter and were formed on 400 micron centers. In order to show the effect regardless of lens size, a series of lenses was produced with variable size and spacing. Three samples for which data were obtained were: 200/240, that is 200 micron diameter lenses on 240 micron centers, 300/360 and 400/480.

Each lens array sample was immersed for sixteen (16) hours at 425° C. in a molten bath composed of 60% by weight KNO3 and 40% by weight NaNO3. The lens power for each sample was measured, both before and after salt bath treatment, and both front and back surface. The results are shown below:

|  | Lens Power (Diopters) | |
|---|---|---|
| Lens Size (Microns) | Before Treatment | After Treatment |
| 200/240 | 890/360 | 890/550 |
| 300/360 | 625/250 | 700/400 |
| 400/480 | 410/195 | 470/240 |

EXAMPLE 6

Two samples, one with 300 micron diameter lenses and the other with 400 micron diameter lenses, were given an ion exchange treatment before lens development to see what influence this would have. Each sample was immersed in a NaNO3 salt bath for one hour at 375° C. Corresponding samples had the same size lenses developed without any ion exchange treatment to provide a check on lens power change.

The results were as follows:

|  | Lens Power (Front/Back) | |
|---|---|---|
| Lens Size | No Exchange | Ion Exchange |
| 300 micron | 940/320 | 660/60 |
| 400 micron | 520/250 | 390/110 |

It is readily apparent that a prior ion exchange has an adverse effect on lens power. In fact, with extended exchange times, lens powers could be reduced to zero, that is effectively eliminating the lens formation effect.

We claim:

1. An optical device composed of a photonucleable, crystallizable, lithium silicate glass body having a clear glass lens array integral with and rising above at least one surface, each lens being surrounded by a crystallized glass matrix, and being characterized by a layer extending below the lens surface wherein the lithium ion content is below the glass composition norm, the content of a larger, exchangeable alkali metal ion is greater than the glass norm for that ion, and the distribution of such alkali metal ion in the lens is defined by both radial and axial concentration gradients.

2. An optical device in accordance with claim 1 wherein the larger monovalent ion is sodium or potassium.

3. An optical device in accordance with claim 1 wherein the glass body has a clear glass lens array integral with and rising above two opposite surfaces.

4. An optical device in accordance with claim 1 wherein the lens surfaces are essentially stress-free and the normal optical power is enhanced.

5. An optical device composed of a photonucleable, crystallizable, lithium silicate, glass body having an array of lens systems in parallel relation and extending through the glass body, each lens system comprising a cylindrical rod of clear glass culminating at opposed surfaces of the glass body as spherical-shaped lenses forming lens arrays on the opposite surfaces, being characterized by a layer extending below the lens surface wherein the lithium ion content is below the glass composition norm, the content of a larger, exchangeable alkali metal ion is greater than the glass norm for that ion, and the distribution of such alkali metal ion in the lens is defined by both radial and axial concentration gradients.

6. An optical device in accordance with claim 5 wherein the larger monovalent ion is sodium or potassium.

7. An optical device in accordance with claim 5 wherein the lens surfaces are essentially stress-free and the normal optical power is enhanced.

8. A method of making an optical device wherein a photonucleable, lithium silicate glass body is selectively crystallized to provide a crystalline matrix surrounding each lens in an array of spherical-shaped clear lenses integral with and rising above the matrix surface characterized by the improvement whereby a larger monovalent ion from an external source is exchanged for the lithium ion in a layer beneath the surface on the clear lenses to create variable alkali metal ion concentrations defined by both radial and axial concentration gradients.

9. A method in accordance with claim 8 wherein the ion-exchanged lenses are heated above the glass strain point to release compressive stresses and enhance the optical power of the lenses.

10. A method in accordance with claim 8 wherein the ion exchange is effected above the glass strain point whereby the exchange and heat treatment are simultaneous.

11. A method in accordance with claim 8 wherein the ion exchange is effected from a molten salt bath.

12. A method in accordance with claim 11 wherein the salt bath is at a temperature above the glass strain point.

13. A method in accordance with claim 8 wherein the larger monovalent ion is sodium or potassium.

* * * * *